United States Patent [19]

Heraty et al.

[11] Patent Number: 4,552,476
[45] Date of Patent: Nov. 12, 1985

[54] COMBINATION HIGH PRESSURE WAND AND BRUSH FOR VEHICLE WASHING

[76] Inventors: Patrick T. Heraty; Michael Heraty, both of 12023 S. 76th Ave., Palos, Ill. 60463

[21] Appl. No.: 587,360
[22] Filed: Mar. 8, 1984
[51] Int. Cl.[4] .................. A46B 11/02; A46B 11/06
[52] U.S. Cl. .............................. 401/136; 401/137; 401/289
[58] Field of Search .................. 401/136, 137, 289

[56] References Cited

U.S. PATENT DOCUMENTS

| | | | |
|---|---|---|---|
| 556,722 | 3/1896 | Ford | 401/136 |
| 1,549,258 | 8/1925 | Jernholm | 401/136 |
| 1,676,857 | 7/1928 | Cheron | 401/136 |
| 1,741,435 | 12/1929 | Rickersberg | 401/136 |
| 2,825,079 | 3/1958 | Shey | 401/136 X |

FOREIGN PATENT DOCUMENTS 588908  5/1925  France ................ 401/136

Primary Examiner—Steven A. Bratlie
Attorney, Agent, or Firm—Richard G. Kinney

[57] ABSTRACT

A combination tool for use in vehicle washing is disclosed in two embodiments. The tool combines a foaming brush wherein water (or water plus detergent) is cascaded from the brush base through its bristles and a cleaning wand wherein a narrow stream of high pressure water is emitted from a terminal nozzle. The tool provides for the brush housing to fit about the wand and be positioned at a distance from the wand's nozzle end when the combination is used as a wand but allow the wand to be drawn into the brush housing to be seated at the base of the brush so its output also serve to supply liquid to the brush. In both embodiments mechanical bias in the form of a helical compression spring positioned in the housing and about the wand keep the housing away from the wand end or alternatively latched in place at the base of the brush and a baffle is provided to convert the high pressure stream to a flow.

In the first embodiment two wand paths, forming a V, are provided in the housing with modal conversion being achieved by drawing the wand rearward in the housing against the compression spring and pivoting it between the paths. In the second embodiment one path is provided and conversion is provided by sliding a baffle down across the nozzle end of the wand after it is down inside the housing.

6 Claims, 6 Drawing Figures

# COMBINATION HIGH PRESSURE WAND AND BRUSH FOR VEHICLE WASHING

BACKGROUND OF THE INVENTION

1. Field of the Invention

The present invention relates to a combination high pressure wand and brush for vehicle washing.

2. Description of the Prior Art

In self-service car or truck washes, it is common commercial practice to provide a "wand", a flexible hose with a high-pressure nozzle end through which is pumped, under pressure, a narrow stream of water. Pressures of 1,000 pounds per square inch are commonly used to produce a stream of water that may be manually directed by the user over the surface of the car, truck or other machinery desired to be cleaned. Some car washes also provide brushes, some of which are supplied with water, normally at a lower pressure, e.g., 30 pounds per square inch, to their bases so that water flows down the bristles.

SUMMARY OF THE INVENTION

The present invention provides a combination brush and wand unit whereby the need for a separate brush and water supply is eliminated and the same high pressure wand supply can serve its conventional function as well as the source of water to the brush.

In accordance with the present invention, a combination brush and wand unit is provided whereby the wand may assume two stable positions, one of which has the wand projecting away from the brush and another wherein the nozzle is safely held at the base of the brush to provide liquid thereto.

The invention, together with the advantages thereof, may best be understood by reference to the following description taken in connection with the accompanying drawings, in the several figures of which, like reference numerals identify like elements.

DESCRIPTION OF THE PREFERRED EMBODIMENTS

Figure 1:
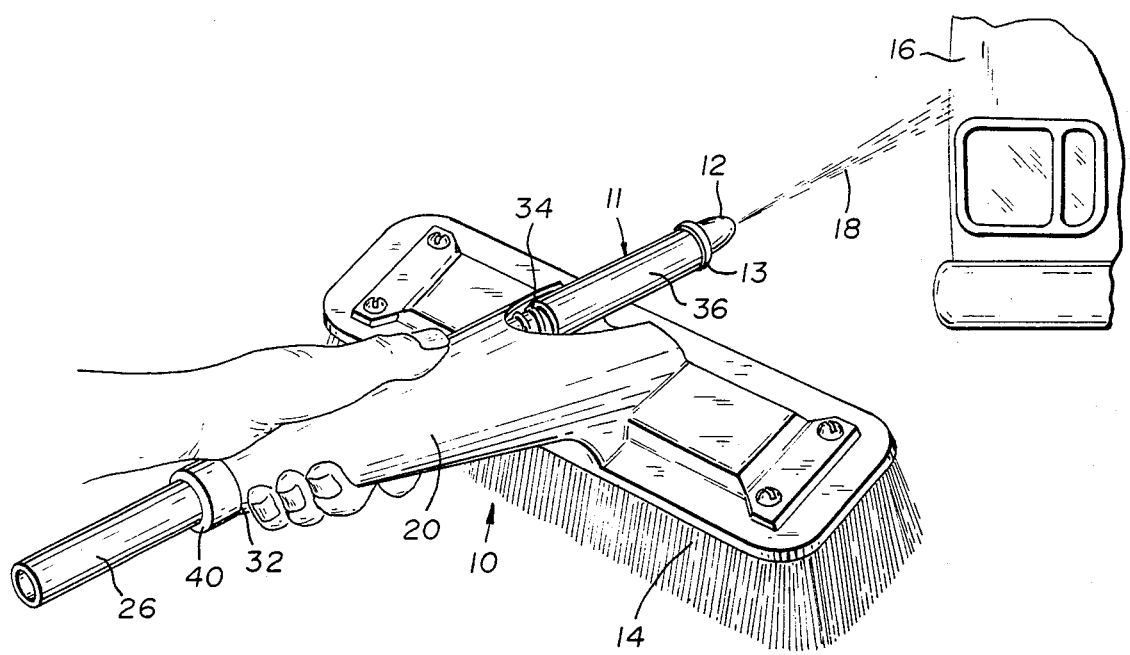
FIG. 1 is a perspective view of a combination brush-wand washing unit constructed in accordance with the present invention shown in use in cleaning a vehicle (shown fragmentarily) in one mode of use.

Referring to FIG. 1, there is depicted a combination brush and wand unit 10 constructed in accordance with the present invention. The unit 10 is shown in its "wand" configuration, wherein the wand 11 extends from it with its nozzle 12 at a distance removed from the brush 14 and thus can be used to clean a vehicle 16 by directing a high-pressure stream of water 18 onto it. In this configuration, the unit 10 may be effectively used as a conventional wand with the brush 14 safely out of the way of the vehicle 16.

Figure 2:
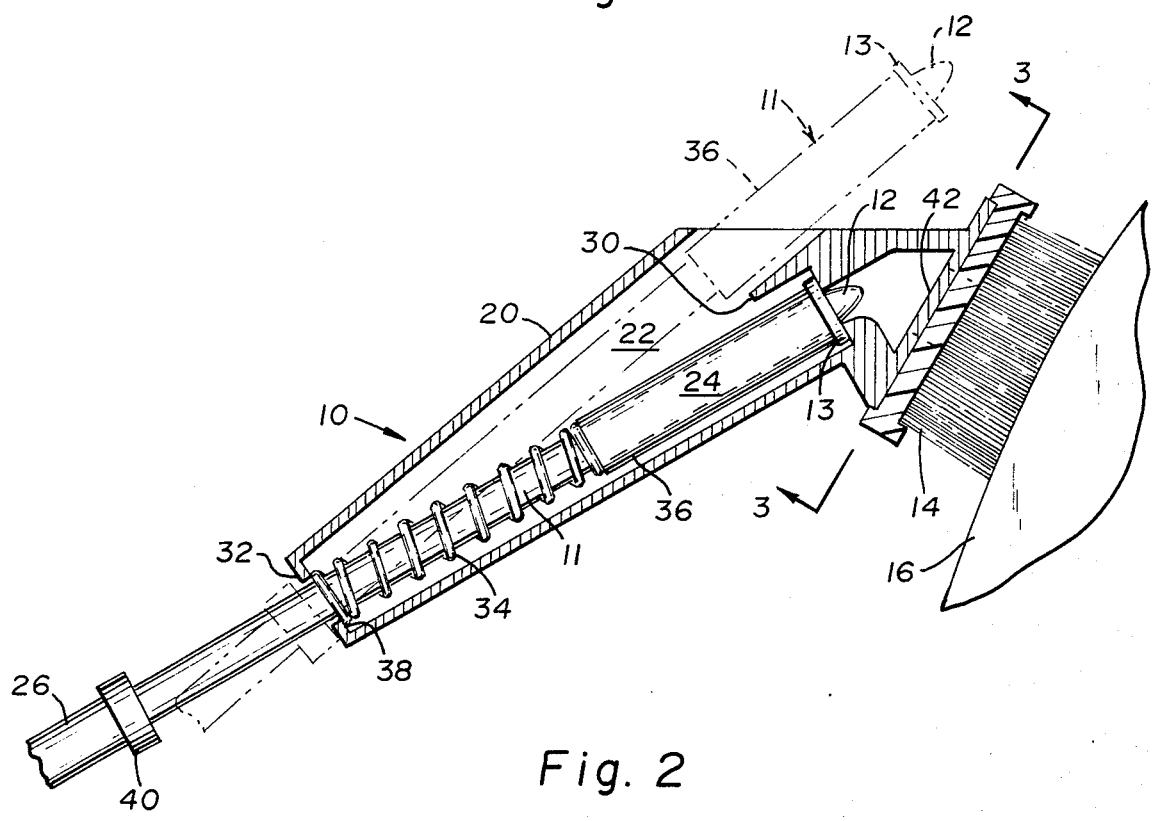
FIG. 2 is a partly sectional view of the brush-wand washing unit of FIG. 1, in a different mode of use in cleaning the vehicle with parts in a moved position shown in phantom line.

The unit 10 includes a housing 20 that defines, as better shown in FIG. 2, a first tubular path 22 through which the wand 11 may extend (as shown in dashed lines in FIG. 2) and also a second tubular path 24 into which the wand can be easily moved and releasable secured so as to provide the brush 14 with liquid at its base so that it can be effectively used to scrub the vehicle 16.

The wand 11 is primarily made of round pipe which fits within the housing 20 with sufficient clearance so as to be able to easily rotate therein (360° or more) so as to prevent tangling of the hose connected to the wand during use.

The transfer from the wand configuration of FIG. 1 to the brush configuration of FIG. 2 is easily affected by the user simply grasping the rear end portion 26 of the wand (FIG. 1) and pulling it backward from the housing 20 until the nozzle 12 clears the internal point 30 (FIG. 2) and moving it to its seat at the base of the brush 14 (shown in solid line in FIG. 2).

A compressible helical spring 34 is provided about the wand and is compressed between a sleeve 36 and an interior housing rim 38 at the opening 32 into the housing 20. The sleeve 36 is, in turn, kept in place by a flange 13 of the nozzle 12.

The spring 34 urges the wand and the nozzle 12 toward its seat at the base of the brush 14 until the user decides to again return to the wand mode of operation. To achieve the changeover, the user need only grasp the end 26 of the wand 11 and pull it rearward until the nozzle 12 again clears the point 30, then pivot the wand 11 slightly upward into path 22. By lessening the pull on the wand, the spring 34 will move the wand and nozzle 12 out of the housing 20. To prevent the wand from projecting too far out of the housing 20, a "stop" of some sort may be provided. This may be a simple bend in the rearward portion of the wand, a hose encircling the wand, or as shown in FIGS. 1 and 2, a "stop" ring 40.

Figure 3:
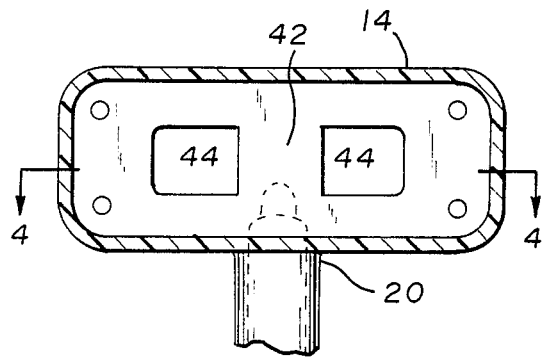
FIG. 3 is a partly sectional view of the invention of FIGS. 1 and 2 as seen from the plane defined by the line 3—3 of FIG. 2 when looking in the direction of the arrows.
Figure 4:
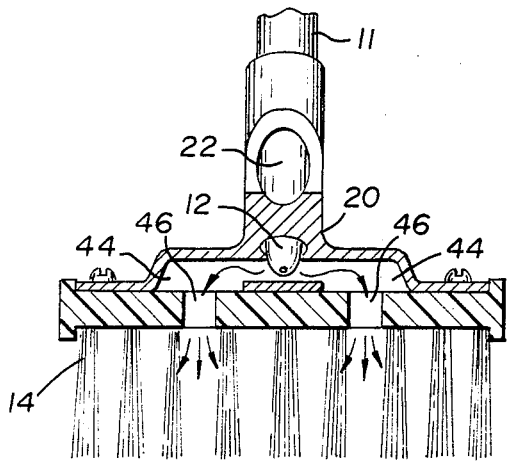
FIG. 4 is a sectional view of the brush-wand washing unit of FIGS. 1-3 as seen from the plane defined by the line 4—4 of FIG. 3 when looking in the direction of the arrows.

Because the water from the nozzle is under a great deal of pressure, a baffle plate 42 is provided at the area in front of the nozzle when it is seated in the base of the brush 14 (FIGS. 2 and 3). In this case, the water flow strikes the plate 42 and eventually flows through adjacent openings 44 in the housing to the base of the brush and through large holes 46 in the brush base that open into the bristles. The net effect is to provide a much larger opening for the water flow, thus slowing the high pressure stream to the more conventional lower pressure flow used in conventional water-fed vehicle washing brushes.

Figure 5:
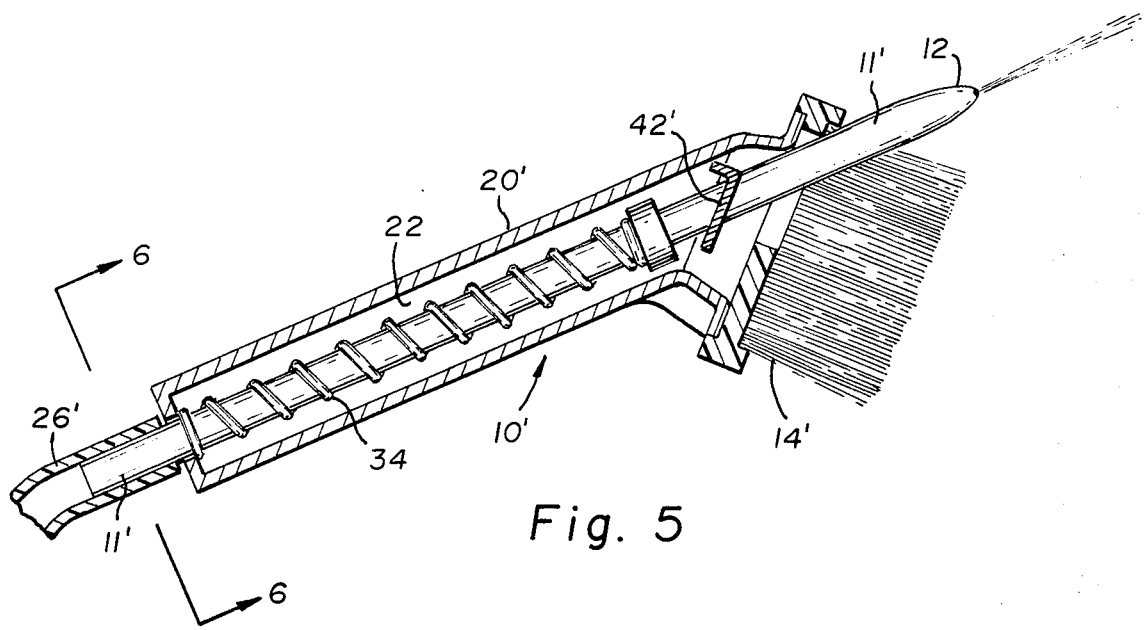
FIG. 5 is a partly sectional view, of a second embodiment of the invention.
Figure 6:
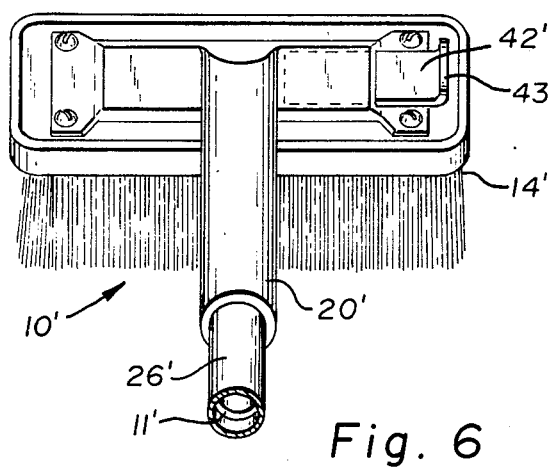
FIG. 6 is a view, partly in section, of the invention of FIG. 5 as seen from the line 6—6 of FIG. 5, when looking in the direction of the arrows.

A second embodiment of the inventive combination brush-wand unit is illustrated in FIGS. 5 and 6 and designated generally by the number 10'. In this unit, a single tubular path 22 is provided through the housing 20'. This path 22 continues through the base of the brush 14' and allows the wand 1' to extend therethrough as illustrated in FIG. 5. When it is desired to change over to a liquid-supplied brush, the user again draws the rear portion 26' rearward from the housing 20' (compressing the spring 34 until the nozzle 12 is retracted entirely within the housing 20' and until it clears (is left of, in FIG. 5) a baffle plate sliding valve 42'. The user then slides this plate of the valve 42' inward (to the left, in FIG. 5) by pushing on a handle extension (shown in FIG. 6) of the plate of the valve 42' and releasing the portion 26'. The spring 34 then holds the nozzle against this plate of the valve 42'. In this configuration, the unit can be used a a water-supplied brush.

To return the "wand" configuration, the user need only slide the plate of the valve 42' out of the way and the spring will return the wand and nozzle 12 to the configuration shown in FIG. 5.

While having the advantage of simplicity of construction, this second embodiment is not preferred over the first as, in practice, the first embodiment is easier to use, especially as there is no need or even desirability to turn off the water to the wand in the first embodiment while changing between the wand and brush states.

An advantage afforded by both embodiments and by the invention in general is that the weight of the brush and housing tends to hold down the wand, preventing it from snaking or whipping around (as prior art high pressure hoses and wands tend to do if released when "on") and the shape of the housing prevents the combination from moving on the ground when so released.

Prototypes of both versions have been constructed, tested, and proven to be advantageous. In each case, the brush housing was constructed using a Universal Brush Mfg. Co. commercial water-fed brush sold as their car wash foaming brush. Such brushes are about 9 inches by 3-½ inches in base size with 2-¼ inch bristles. The housing 20 was about 11 inches in height when 20' was about 3 feet. The wand portion was ½ inch outside diameter steel pipe fitted with a nozzle 12 of the ⅛ inch male No. 6 type. The spring was a helical compression spring about ⅜ inch in inside diameter.

While the above depicted and described units are presently preferred as the best mode of practicing the invention, the reader will realize that the invention may be employed in many different and varied constructions and, indeed, the inventors themselves may well decide after further experimentations or experience to further modify the structure or use alternative constructions.

While two particular embodiments of the invention have been shown and described, it will be obvious to those skilled in the art that changes and modifications may be made without departing from the invention and, therefore, the aim in the appended claims is to cover all such changes and modifications as fall within the true spirit and scope of the invention.

For example, the wand 11 may be longer than depicted so as to extend away from the brush when the combination tool is used in its wand mode so as to eliminate or reduce any inadvertment contact between the vehicle and the brush during use as a wand.

What is claimed is:

1. A combination brush-wand washing unit for cleaning an object comprising:
   a high-pressure wand having a nozzle;
   a housing through which the said high-pressure wand may project;
   a brush mounted on the housing; and
   means for allowing the wand to be moved between a first position wherein said wand and its nozzle projects from the housing with the nozzle at a distance from the housing and brush for emitting a stream of high-pressure liquid therefrom, and a second position wherein the wand nozzle is within the housing such as to direct its flow to and through the brush,
   whereby the user may alternatively and selectively use the unit as a cleaning high-pressure wand close to the object without fear of the housing or brush hitting or scraping the object or as a liquid flowing brush.

2. The invention of claim 1 wherein the tool includes a housing which defines two pathways within it for the wand, one of which allows the wand to project out of the housing and the other of which allows the wand to be seated at the base of the brush.

3. The invention of claim 1 wherein mechanical bias means are provided for urging the wand nozzle end outward from the housing, which means serves to keep the wand nozzle end and the housing separated during normal use as a wand in said first position and also serves to urge and hold the nozzle in place within the housing when in said second position.

4. The invention of claim 3 wherein the user may alternate between the uses by pulling the wand through the housing against the mechanical bias.

5. The invention of claim 4 wherein the tool includes a housing which defines two pathways within it for the wand, one of which allows the wand to project out of the housing and the other of which allows the wand to be seated at the base of the brush.

6. A combination brush-wand washing unit for cleaning an object comprising:
   a wand having a nozzle;
   a housing through which the said wand may project;
   a brush mounted on the housing; and
   means for allowing the wand to be moved between a first position wherein said wand and its nozzle projects from the housing with the nozzle at a distance from the housing and brush for emitting a stream of liquid therefrom, and a second position wherein the wand nozzle is within the housing such as to direct its flow to and through the brush,
   whereby the user may alternatively and selectively use the unit as a cleaning wand close to the object without fear of the housing or brush hitting or scraping the object or as a liquid flowing brush.

* * * * *